United States Patent
Groepl et al.

(10) Patent No.: US 10,425,161 B2
(45) Date of Patent: Sep. 24, 2019

(54) CIRCUIT ARRANGEMENT AND CORRESPONDING METHOD

(71) Applicant: Silicon Line GmbH, Munich (DE)

(72) Inventors: Martin Groepl, Sonthofen Oberallgaeu (DE); Holger Hoeltke, Munich (DE)

(73) Assignee: Silicon Line GmbH, Munich (DE)

( * ) Notice: Subject to any disclaimer, the term of this patent is extended or adjusted under 35 U.S.C. 154(b) by 246 days.

(21) Appl. No.: 15/281,767

(22) Filed: Sep. 30, 2016

(65) Prior Publication Data

US 2017/0019177 A1    Jan. 19, 2017

Related U.S. Application Data

(63) Continuation of application No. PCT/EP2015/057276, filed on Apr. 1, 2015.

(30) Foreign Application Priority Data

Apr. 1, 2014    (DE) .................. 10 2014 206 226

(51) Int. Cl.
  *G06F 13/42* (2006.01)
  *G06F 13/38* (2006.01)
  *H04B 10/25* (2013.01)
  *H04B 10/50* (2013.01)

(52) U.S. Cl.
  CPC ....... *H04B 10/2504* (2013.01); *G06F 13/385* (2013.01); *G06F 13/4282* (2013.01); *H04B 10/25* (2013.01); *H04B 10/502* (2013.01); *H04B 10/503* (2013.01)

(58) Field of Classification Search
  None
  See application file for complete search history.

(56) References Cited

U.S. PATENT DOCUMENTS

| | | | |
|---|---|---|---|
| 6,704,890 B1* | 3/2004 | Carotti | H04L 25/14 714/700 |
| 8,391,420 B1* | 3/2013 | An | H04L 25/0292 322/20 |
| 8,432,981 B1* | 4/2013 | An | H04K 3/22 375/260 |
| 8,719,475 B2* | 5/2014 | Ma | G06F 13/426 710/110 |

(Continued)

OTHER PUBLICATIONS

International Search Report issued in PCT/EP2015/057276; dated Jun. 25, 2015.

*Primary Examiner* — Michael Sun
(74) *Attorney, Agent, or Firm* — Studebaker & Brackett PC (57) ABSTRACT

Enabling Low Frequency Periodic Signalling over an optical link with a circuit arrangement and method for controlling a light-emitting component, including: monitoring a differential input for the presence of an electrical idle state by an IDLE detector; triggering a time delay block by the IDLE detector when the electrical idle state at the differential input is interrupted or resumed; detecting whether the differential input is driven by a Low Frequency Periodic Signalling or by a Super Speed/Enhanced Super Speed signalling by a signal type detector; making a decision whether the signalling is to be transmitted by a decision circuit; an input stage connected to the decision circuit; and driving the light-emitting component by an output stage.

19 Claims, 3 Drawing Sheets

(56) References Cited

U.S. PATENT DOCUMENTS

| | | |
|---|---|---|
| 2012/0128091 A1 | 5/2012 | Fountain |
| 2012/0141132 A1 | 6/2012 | Walker |
| 2012/0191997 A1* | 7/2012 | Miller ........................ G06F 1/32 |
| | | 713/323 |
| 2013/0262731 A1* | 10/2013 | Ranganathan ........ G06F 13/426 |
| | | 710/305 |
| 2016/0278141 A1* | 9/2016 | Emami ..................... G06F 1/26 |
| 2016/0278142 A1* | 9/2016 | Babbage, II .......... H04W 76/12 |

* cited by examiner

CIRCUIT ARRANGEMENT AND CORRESPONDING METHOD

CROSS-REFERENCE TO RELATED APPLICATIONS

This application is a continuation of international (WO) patent application no. PCT/EP2015/057276, filed 1 Apr. 2015, which claims the priority of German (DE) patent application no. 10 2014 206 226.8, filed 1 Apr. 2014, the contents of each being hereby incorporated herein by reference.

FIELD OF THE INVENTION

The present invention basically relates to the technical field of transmitting signals over at least one optical link, said signals being in particular based on U[niversal]S[erial]B[us] 3 standard, for example on USB 3.0 standard or on USB 3.1 standard.

More specifically, the present invention relates to a circuit arrangement and method for controlling at least one light-emitting component as well as to a circuit arrangement and method for processing an optical signal received from at least one light-receiving component.

BACKGROUND OF THE INVENTION

Serial communications/interconnect protocols provide efficient mechanisms to communicate between different devices. These protocols can include standards defining signal properties, timing and state changes required for compatibility with the protocol. One serial communications protocol is the U[niversal]S[erial]B[us] protocol.

USB has been widely adopted in the electronics industry, wherein the USB 3 protocol enables a data rate of at least five Gigabits per second (5 Gbps), thus offering significant improvements in speed over USB 2.0 as well as significant power savings. USB 3 can be used in many different devices including, but not limited to, desktop computers, laptops, tablets, external hard drives, printers, cell phones and smart phones.

In this context, high-speed USB interfaces utilize a sideband of communication for managing signal initiation and low power management on the bus on a link between two ports. This sideband is referred to as Low Frequency Periodic Signalling (LFPS). LFPS employs a predetermined frequency range to communicate the initialization and power management information. For example, USB 3 utilizes LFPS whereas the previous two USB versions (=USB 1 and USB 2) do not utilize LFPS.

To ensure the proper operation of a high-speed interface using the USB 3 specification, a receiver must correctly detect high-speed data rates. Additionally, to reduce the cost of power management, the receiver may include a LFPS detector for detecting low-speed LFPS signals with a data rate of ten MHz to fifty MHz in a low-power USB 3.0 link.

A passive galvanic cable (inter)connection between a USB host and a USB device is limited to approximately 1.5 m.

A remote host device based on the USB 3 standard can be connected over a fiber to a USB root port; however, the USB standard based Low Frequency Periodic Signalling (LFPS) is not directly suitable for an electro-to-optical transmitter.

An active galvanic cable connection with repeaters based on the USB 3.1 standard requires complex implementations of the remote host device and the USB 3.1 repeaters due to full support of the protocol level.

The USB 3.1 standard defines the electrical idle (EI) state and two types of signalling for the communication between two USB 3.1 enabled devices. The first signalling type is the Low Frequency Periodic Signalling (LFPS), and the second type is the SuperSpeed (SS) signalling or enhanced SuperSpeed (eSS) signalling.

The LFPS together in combination with the electrical idle (EI) state creates an LFPS sequence or LFPS based PWM (pulse-width modulation) signalling (LBPS). The LBPS provides the basis for an LFPS based PWM message (LBPM).

The electrical idle (EI) state is defined as zero differential input voltage $V_{indiff}$. While in the electrical signalling domain such a third level can be easily transmitted (differential positive, differential negative, and zero differential input voltage), typical optical data transmission systems can usually transport only two signalling states: optical "0" and optical "1".

Due to this electrical idle (EI) state, an LFPS sequence is not suitable for the direct transmission over an optical link. In order to transmit an LFPS sequence over an optical link it has to be translated first to a suitable data format.

In contrast, the SS/eSS signalling uses a D[irect]C[urrent]-balanced, non-return-to-zero (NRZ) line code, which is well suitable for a direct transmission over an optical link.

OBJECTS AND SUMMARY OF THE INVENTION

Starting from the above-explained disadvantages and inadequacies as well as taking the outlined prior art into account the object of the present invention is to further develop a circuit arrangement of the above-mentioned type as well as a method of the above-mentioned type in such a way that Low Frequency Periodic Signalling (LFPS) over at least one optical link is enabled.

This object is achieved by a circuit arrangement according to the present invention with the herein described features and by a method according to the present invention with the herein described features. Advantageous embodiments and expedient further developments of the present invention are characterized in the respective dependent claims.

This object is achieved by a circuit arrangement for controlling at least one light-emitting component, said circuit arrangement comprising:

at least one IDLE detector for monitoring at least one differential input for the presence of an electrical idle state;

at least one time delay block being triggered by the IDLE detector when the EI state at the differential input gets interrupted or is resumed;

at least one signal type detector for detecting whether the differential input is driven by a L[ow]F[requency]P[eriodic]S[ignalling] or by a S[uper]S[peed]/e[nhanced]S[uper]S[peed] signalling, said signal type detector having a decision latency time being less than the time delay provided by the time delay block;

at least one decision circuit for making a decision whether LFPS or SS/ess signalling is to be transmitted, said decision being based on information from the IDLE detector and/or from the signal type detector;

at least one input stage being connected to the decision circuit; and at least one output stage being provided for driving the light-emitting component, said output stage being turned on or turned off by the decision circuit.

This object is further achieved by an embodiment of the circuit arrangement according to the present invention, wherein the time delay block is at least one edge-triggered time delay unit providing a time delay of about 350 ns.

This object is further achieved by an embodiment of the circuit arrangement according to the present invention, wherein the delay time is chosen with respect to distinguishing a LFPS ping sequence representing an LFPS burst of not longer than about 200 ns, and an LBPS logic "0" being represented by an LFPS burst of at least about 500 ns.

This object is further achieved by an embodiment of the circuit arrangement according to the present invention, wherein the light-emitting component is at least one electro-optical transducer, in particular at least one light-emitting diode (=L[ight]E[mitting]D[iode]) or at least one electroluminescent diode or at least one laser, for example at least one semiconductor laser.

This object is further achieved by a circuit arrangement for processing an optical signal received from at least one light-receiving component, said circuit arrangement comprising:
  at least one decision circuit including a time delay functionality, said decision circuit being triggered by the optical signal;
  at least one oscillator stage being gated or switched on by at least one enable signal from the decision circuit;
  at least one L[ow]F[requency]P[eriodic]S[ignalling] output driver being activated in case of the optical signal being based on LFPS;
  at least one S[uper]S[peed]/e[nhanced]S[uper]S[peed] output driver being activated in case of the optical signal being based on SS/eSS signalling.

This object is further achieved by an embodiment of the circuit arrangement according to the present invention, wherein at least one amplifier is connected upstream of the decision circuit.

This object is further achieved by an embodiment of the circuit arrangement according to the present invention, wherein the amplifier is at least one transimpedance amplifier and/or at least one limiting amplifier.

This object is further achieved by an embodiment of the circuit arrangement according to the present invention, wherein the time delay functionality provides a time delay of about 350 ns.

This object is further achieved by an embodiment of the circuit arrangement according to the present invention, wherein the oscillator stage comprises a frequency of about 30 MHz.

This object is further achieved by an embodiment of the circuit arrangement according to the present invention, wherein the light-receiving component is at least one photo diode.

This object is further achieved by an embodiment of the circuit arrangement according to the present invention, wherein the LFPS or the SS/eSS signalling is based on USB 3, in particular on USB 3.0 or on USB 3.1.

This object is further achieved by a method for controlling at least one light-emitting component by means of at least one circuit arrangement, comprising the steps of:
  monitoring at least one differential input for the presence of an electrical idle state by means of at least one IDLE detector;
  triggering at least one time delay block by means of the IDLE detector when the EI state at the differential input gets interrupted or is resumed;
  detecting whether the differential input is driven by a L[ow]F[requency]P[eriodic]S[ignalling] or by a S[uper]S[peed]/e[nhanced]S[uper]S[peed] signalling by means of at least one signal type detector, said signal type detector having a decision latency time being less than the time delay provided by the time delay block;
  making a decision whether LFPS or SS/ess signalling is to be transmitted by means of at least one decision circuit, said decision being based on information from the IDLE detector and/or from the signal type detector;
  at least one input stage being connected to the decision circuit; and
  driving the light-emitting component by means of at least one output stage, said output stage being connected downstream at least one input stage and being turned on or turned off by the decision circuit.

This object is further achieved by a method for processing an optical signal by means of at least one circuit arrangement, said optical signal having been received from at least one light-receiving component, comprising the steps of:
  triggering by means of the optical signal at least one decision circuit including a time delay functionality;
  gating or switching on at least one oscillator stage by at least one enable signal from the decision circuit;
  activating at least one L[ow]F[requency]P[eriodic]S[ignalling] output driver in case of the optical signal being based on LFPS;
  activating at least one S[uper]S[peed]/e[nhanced]S[uper] S[peed] output driver in case of the optical signal being based on SS/eSS signalling.

This object is further achieved by a use of at least one circuit arrangement according to the present invention and/or of the method according to the present invention for a USB 3, in particular USB 3.0 or USB 3.1, data transport protocol serial communication link over at least one optical transmission line.

This object is further achieved by an embodiment of the use according to the present invention, wherein the optical transmission line is at least one waveguide, in particular at least one fibre, for example at least one glass fibre.

The present invention deals with the mechanism of LFPS sequence translation to a data format suitable for transmission over at least one optical link.

The LFPS signal is defined as a periodic signal with a period of 20 ns to 100 ns. LFPS based PWM (pulse-width modulation) signalling (LBPS) is used to transmit two logic states based on the time duration ratio of the actual LFPS signal to the subsequently following electrical idle (EI) state. A time ratio of LFPS to EI state of one-half (1:2) refers to a logic "0", and a ratio of two (2:1) refers to a logic "1".

The electrical circuit arrangement according to the present invention as well as the method according to the present invention translate the time duration ratios into non-return-to-zero (NRZ) signals, which are suitable for optical data transmission.

Within the scope of the present invention, the term light or light-emitting or light-receiving is understood not only as the range of electromagnetic radiation visible to the eye, extending in a wavelength range from about 380 nanometers to about 780 nanometers (which corresponds to a frequency of about 789 terahertz down to about 385 terahertz).

Rather, the term light or light-emitting is understood as the entire electromagnetic wavelength or frequency spectrum, including the spectrum not visible to the eye, in particular the I[nfra]R[ed] range (wavelength range up to about 2,000 nanometers or frequency range down to about 150 terahertz), for example a wavelength of about 850 nanometers or a frequency of about 350 terahertz.

The present invention has the following advantages:
- simplified translation of USB standard based L[ow]F[requency]P[eriodic]S[ignalling] to a suitable data format for an electro-to-optical transmitter as well as for an optical-to-electro receiver;
- implementation of the present invention within physical layer of the USB 3 protocol without need to analyze the data at protocol level;
- enablement of transmission of USB 3.0 or USB 3.1 standard compliant data over optical links, which allows extension of USB host-to-device interconnection lengths, in particular compared to passive galvanic cable (inter)connections.

BRIEF EXPLANATION OF THE DRAWINGS

As already discussed above, there are various possibilities for embodying and further developing the teaching of the present invention in an advantageous manner. For this purpose, on the one hand reference is made to the explanations above as well as to the dependent claims, and on the other hand further embodiments, features and advantages of the present invention are explained in greater detail below, inter alia by way of the exemplary embodiment illustrated by FIG. 1 to FIG. 6.

It is shown in.

Like or similar embodiments, elements or features are provided with identical reference numerals in FIG. 1 to FIG. 6.

DETAILED DESCRIPTION OF THE INVENTION

Figure 1:
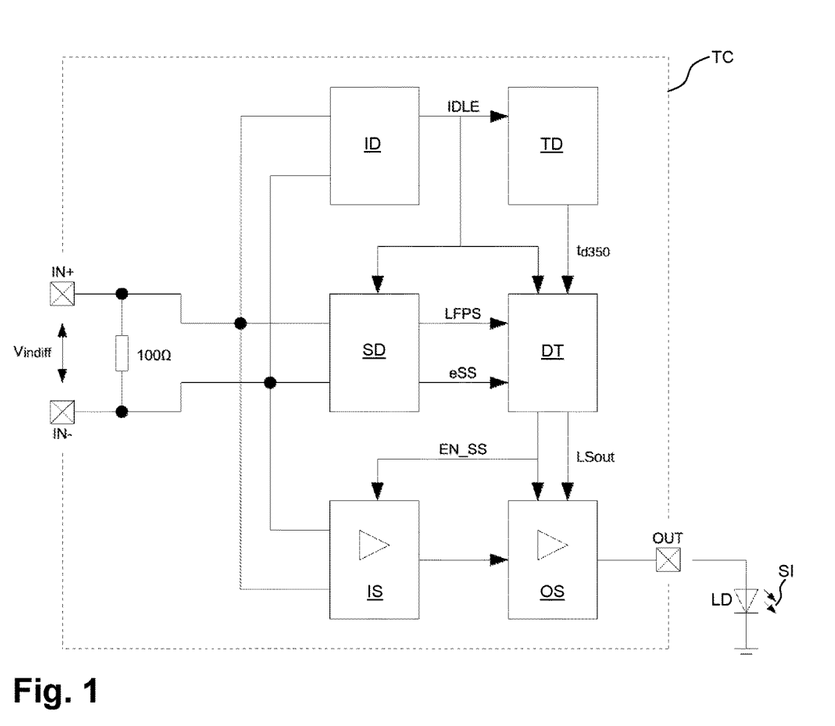
FIG. 1 in a conceptual schematic view an embodiment of the transmitting part or transmitting side of a circuit arrangement according to the present invention, said circuit arrangement operating according to the method of the present invention.

The principle schematic of an optical transmitter TC suitable for transporting USB 3.1 signals is shown in FIG. 1.

The main building blocks of this transmitting part or transmitting side of a circuit arrangement TC are as follows:

- IDLE detector ID;
- signal type detector SD;
- edge-triggered 350 ns time delay TD;
- decision circuit DT;
- input stage IS and output stage OS.

The IDLE detector ID is directly connected to the differential input IN+, IN− of the optical transmitter TC where it monitors this input IN+, IN− for the presence of the electrical idle (EI) state.

The signal type detector SD, which is also connected to the differential input IN+, IN− of the optical transmitter TC, detects whether this input IN+, IN− is driven by an L[ow]F[requency]P[eriodic]S[ignalling] or by an S[uper]S[peed]/e[nhanced]S[uper]S[peed] signalling.

Based on information received from the IDLE detector ID and the signal type detector SD the decision circuit DT will make a decision whether LFPS or SS/eSS should be transmitted. Due to the logical conjunction between the td350 signal from the edge-triggered 350 ns time delay block TD and the IDLE signal, this decision takes only place approximately 350 ns later after a link state at the differential input IN+, IN− of the optical transmitter TC has changed.

The delay time td350 (=of approximately 350 ns) is chosen with respect to distinguishing the LFPS ping sequence, which represents an LFPS burst of not longer than 200 ns, and the LBPS logic "0" which is represented by an LFPS burst of at least 500 ns.

Thus, an LFPS burst with any time duration between 200 ns to 500 ns is not a valid LFPS signal according to the USB 3.1 standard. This circumstance allows the circuit arrangement TC according to the present invention as well as the method according to the present invention to differentiate between the different LFPS bursts.

Figure 2:
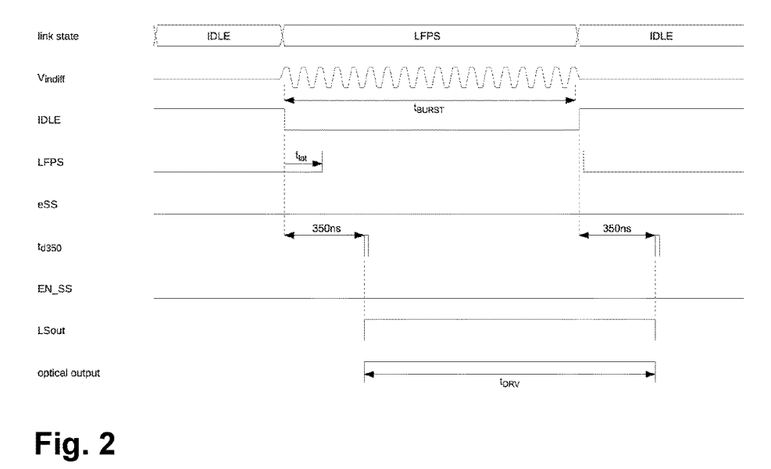
FIG. 2 in a comparative diagrammatic view a L[ow]F[requency]P[eriodic]S[ignalling] transmission at the transmitting part or transmitting side of the circuit arrangement of FIG. 1, wherein time is plotted on the right axis.

The principle of LFPS transmission at the optical transmitter TC is shown in FIG. 2.

When the electrical idle (EI) state at the differential input IN+, IN− of the optical transmitter TC gets interrupted (IDLE signal is de-asserted), the IDLE detector ID will trigger a counter of the 350 ns time delay block TD and the signal type detector SD.

The signal type detector SD has a certain decision latency time $t_{lat}$. It is essential for the functionality of the circuit arrangement TC of the present invention as well as of the method according to the present invention that this decision latency is less than the delay introduced by the 350 ns delay block TD.

As soon as the approximately 350 ns delay is over, the decision circuit DT turns on the output stage OS, which will drive through the laser diode LD a constant current (signal LSout is asserted) which will be converted to an optical signal SI by the laser diode LD.

The turn off of the optical signal SI happens in a similar way. As soon as a new electrical idle (EI) state at the differential input IN+, IN− of the optical transmitter TC gets detected (IDLE signal is asserted), the counter of the 350 ns time delay block TD is started again. As soon as the approximately 350 ns delay is over, the decision circuit DT turns off the output stage OS, which will shut down the constant current through the laser diode LD (signal LSout is de-asserted).

As shown in FIG. 2, the time duration of LFPS signal $t_{BURST}$ at the input is equal to the time duration of the output stage drive $t_{DRV}$ but delayed by approximately 350 ns.

This introduced delay is not critical to the overall system because it equals to a delay, which would be introduced by a respectively longer USB 3.1 cable length.

With the circuit arrangement of the present invention as well as with the method of the present invention, the input LFPS signal of the optical transmitter TC translates to its envelope at the output OUT of the optical transmitter TC. The main advantage of this approach is that the time duration is preserved and is independent from the latency of the signal type detector SD, and thus enables a low-power implementation of the optical transmitter TC.

Figure 3:
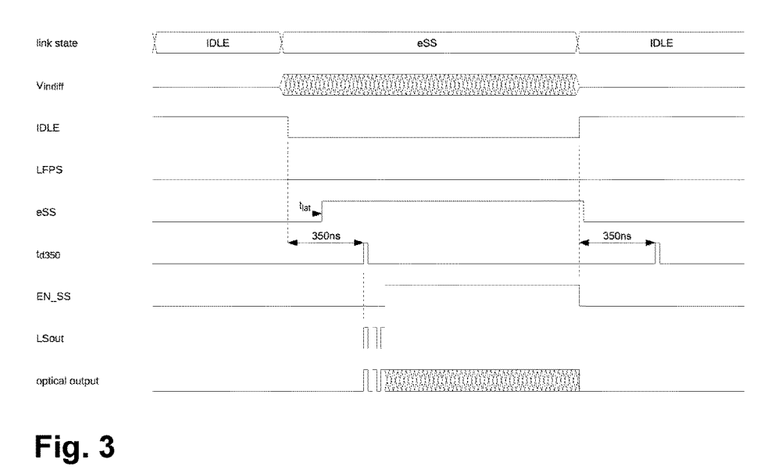
FIG. 3 in a comparative diagrammatic view a S[uper]S[peed]/e[nhanced]S[uper]S[peed] signalling transmission at the transmitting part or transmitting side of the circuit arrangement of FIG. 1, wherein time is plotted on the right axis.

The principle of S[uper]S[peed]/e[nhanced]S[uper]S[peed] signalling transmission at the optical transmitter TC is shown in FIG. 3. A similar approach as with the LFPS transmission of FIG. 2 is taken here.

When the electrical idle (EI) state at the differential input IN+, IN− of the optical transmitter TC gets interrupted (IDLE signal is de-asserted), the IDLE detector ID will trigger the counter of the 350 ns time delay block TD and the signal type detector SD.

Based on the S[uper]S[peed]/e[nhanced]S[uper]S[peed] signal input type the signal type detector SD will assert its SS/eSS output within less than the approximately 350 ns delay, which tells the connected decision circuit DT to turn on the input stage IS and the output stage OS in such a way that it can support SS/eSS data transmission.

Prior to propagation of the SS/eSS input signal to the optical output OUT the output stage OS is driven with three consecutive pulses from the decision circuit DT via the signal LSout with a pulse duration of approximately 25 ns.

Figure 4:
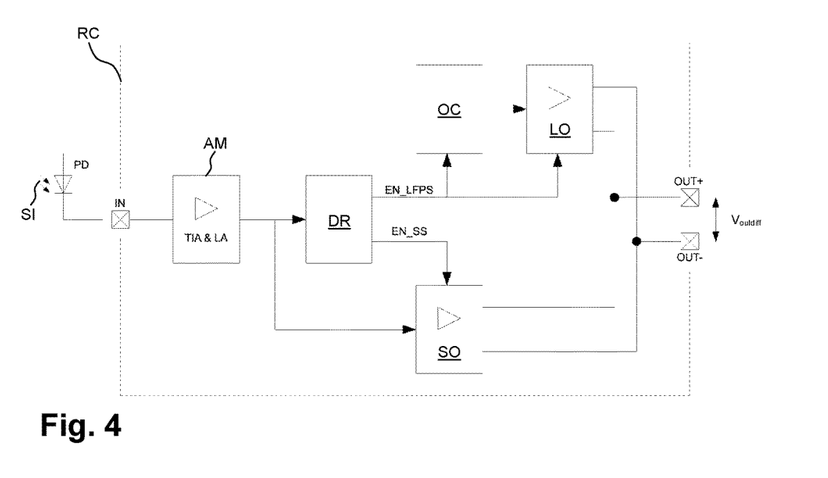
FIG. 4 in a conceptual schematic view an embodiment of the receiving part or receiving side of a circuit arrangement according to the present invention, said circuit arrangement operating according to the method of the present invention.
Figure 5:
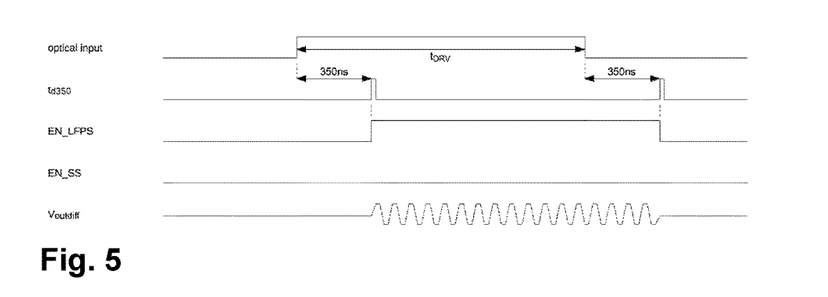
FIG. 5 in a comparative diagrammatic view a L[ow]F[requency]P[eriodic]S[ignalling] restoration at the receiving part or receiving side of the circuit arrangement of FIG. 4, wherein time is plotted on the right axis.
Figure 6:
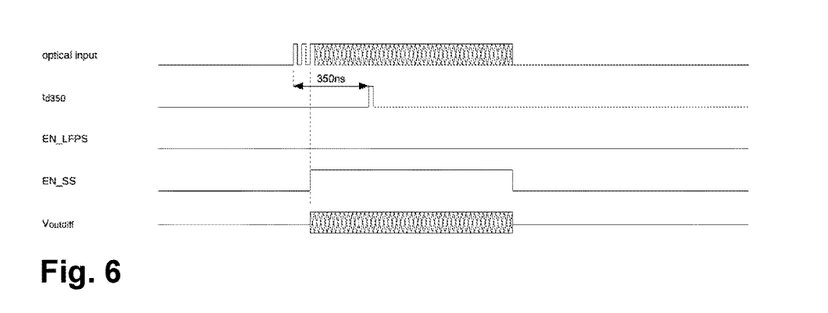
FIG. 6 in a comparative diagrammatic view a S[uper]S[peed]/e[nhanced]S[uper]S[peed] signalling restoration at the receiving part or receiving side of the circuit arrangement of FIG. 4, wherein time is plotted on the right axis.

This approach helps the optical receiver RC (cfl. FIG. 4 to FIG. 6) according to the present invention to determine the input signal type, as will be explained below.

The turn off of the input stage IS and of the output stage OS happens in a similar way. As soon as a new electrical idle (EI) state at the differential input IN+, IN− of the optical transmitter TC gets detected (IDLE signal is asserted), the decision circuit DT immediately turns off the input stage IS and the output stage OS.

The counterpart of the optical transmitter TC, an optical receiver RC, restores from the received optical signal SI the original LFPS burst or outputs the SS/eSS signal at the optical receiver RC.

The principle schematic of the optical receiver RC is shown in FIG. 4.

The main building blocks of this receiving part or receiving side of a circuit arrangement RC are as follows:
   amplifier AM, in particular transimpedance amplifier TIA and limiting amplifier LA;
   decision circuit DR including 350 ns time delay;
   30 MHz oscillator OC;
   LFPS output driver LO;
   SS/eSS output driver ScO.

The principle of LFPS restore at the optical receiver RC is shown in FIG. 5.

The photo diode PD in combination together with the transimpedance amplifier TIA, limiting amplifier LA, and the decision circuit DR translate an incoming optical signal SI to voltage.

When an optical signal SI is detected at the input IN of the optical receiver RC, respectively a certain voltage level at the input of the decision circuit DR, the decision circuit DR and the 350 ns delay counter will be triggered.

As soon as the approximately 350 ns delay is over and the optical input signal SI remained constant within this delay time, the decision circuit DR asserts the enable signal EN_LFPS. The time duration of the incoming optical LFPS signal pulse is equal to the time duration of the asserted enable signal EN_LFPS.

This enable signal EN_LFPS is used to gate (switch on) the internal 30 MHz oscillator OC and to switch over the LFPS output driver LO from driving electrical idle (EI) state to drive the 30 MHz signal of the oscillator OC at the output OUT+, OUT− of the optical receiver RC, which in fact is the restored LFPS signal.

The principle of SS/eSS transmission and SS/eSS restore at optical receiver RC is shown in FIG. 6.

When an optical signal SI is detected at the input IN of the optical receiver RC, the decision circuit DR and the 350 ns delay counter will be started.

If during the 350 ns delay time the receiver RC detects within the optical input signal SI three consecutive pulses with a pulse duration of approximately 25 ns, the decision circuit DR will enable the SS/eSS output driver SO (signal EN_SS is asserted) immediately after the third pulse is detected.

This will enable the optical receiver RC to receive the high-speed SS/eSS signal(s).

LIST OF REFERENCE NUMERALS

AM amplifier
DR decision circuit in circuit arrangement RC
DT decision circuit in circuit arrangement TC
EN_LFPS enable signal from decision circuit DR in case of L[ow]F[requency]P[eriodic]S[ignalling]
EN_SS enable signal from decision circuit DR in case of S[uper]S[peed]/e[nhanced]S[uper]S[peed] signalling
ID IDLE detector
IN input of circuit arrangement RC
IN+ first, in particular positive, terminal of differential input IN+, IN− of circuit arrangement TC
IN− second, in particular negative, terminal of differential input IN+, IN− of circuit arrangement TC
IS input stage
LD light-emitting component
LO L[ow]F[requency]P[eriodic]S[ignalling] output driver
OC oscillator stage
OS output stage
OUT output of circuit arrangement TC
OUT+ first, in particular positive, terminal of differential output OUT+, OUT− of circuit arrangement RC
OUT− second, in particular negative, terminal of differential output OUT+, OUT− of circuit arrangement RC
PD light-receiving component
RC (receiving part or receiving side of) circuit arrangement, in particular optical receiver
SD signal type detector
SI optical signal, in particular light
SO S[uper]S[peed]/e[nhanced]S[uper]S[peed] signalling output driver
TC (transmitting part or transmitting side of) circuit arrangement, in particular optical transmitter
TD time delay block
$V_{indiff}$ voltage at differential input IN+, IN−
$V_{outdiff}$ voltage at differential output OUT+, OUT−

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

The invention claimed is:

1. A circuit arrangement for controlling at least one light-emitting component, said circuit arrangement comprising:
   at least one IDLE detector for monitoring at least one differential input for the presence of an electrical idle (EI) state;
   at least one time delay block being triggered by the IDLE detector when the EI state at the differential input gets interrupted or is resumed;
   at least one signal type detector for detecting whether the differential input is driven by a Low Frequency Periodic Signalling (LFPS) or by a Super Speed (SS)/Enhanced Super Speed (eSS) signalling, said signal type detector having a decision latency time being less than the time delay provided by the time delay block;
   at least one decision circuit for making a decision whether LFPS or SS/eSS signalling is to be transmitted, said decision being based on information from the IDLE detector or from the signal type detector;
   at least one input stage being connected to the decision circuit; and
   at least one output stage being provided for driving the light-emitting component, said output stage being turned on or turned off by the decision circuit,
   wherein the delay time is chosen with respect to distinguishing a LFPS ping sequence representing an LFPS burst of not longer than about 200 ns, and an LFPS based PWM (pulse-width modulation) signalling (LBPS) logic "0" being represented by an LFPS burst of at least about 500 ns.

2. The circuit arrangement according to claim 1, wherein the time delay block is at least one edge-triggered time delay unit providing a time delay of about 350 ns.

3. The circuit arrangement according to claim 1, wherein the light-emitting component is at least one electro-optical transducer.

4. The circuit arrangement according to claim 3, wherein the electro-optical transducer is at least one light-emitting diode or at least one electroluminescent diode or at least one laser.

5. The circuit arrangement according to claim 4, wherein the laser is at least one semiconductor laser.

6. The circuit arrangement according to claim 1, wherein the LFPS or the SS/eSS signalling is based on USB 3.

7. The circuit arrangement according to claim 6, wherein the USB 3 is USB 3.0 or USB 3.1.

8. A circuit arrangement for processing an optical signal received from at least one light-receiving component, said circuit arrangement comprising:
   at least one decision circuit including a time delay functionality, said decision circuit being triggered by the optical signal;
   at least one oscillator stage being gated or switched on by at least one enable signal from the decision circuit;
   at least one Low Frequency Periodic Signalling (LFPS) output driver being activated in case of the optical signal being based on LFPS;
   at least one Super Speed (SS)/Enhanced Super Speed (eSS) output driver being activated in case of the optical signal being based on SS/eSS signalling,
   wherein the delay time is chosen with respect to distinguishing a LFPS ping sequence representing an LFPS burst of not longer than about 200 ns, and an LFPS based PWM (pulse-width modulation) signalling (LBPS) logic "0" being represented by an LFPS burst of at least about 500 ns.

9. The circuit arrangement according to claim 8, wherein at least one amplifier is connected upstream of the decision circuit.

10. The circuit arrangement according to claim 9, wherein the amplifier is at least one transimpedance amplifier or at least one limiting amplifier.

11. The circuit arrangement according to claim 8, wherein the time delay functionality provides a time delay of about 350 ns.

12. The circuit arrangement according to claim 8, wherein the oscillator stage comprises a frequency of about 30 MHz.

13. The circuit arrangement according to claim 8, wherein the light-receiving component is at least one photo diode.

14. A method for controlling at least one light-emitting component by means of at least one circuit arrangement, comprising the steps of:
   monitoring at least one differential input for the presence of an electrical idle (EI) state by means of at least one IDLE detector;
   triggering at least one time delay block by means of the IDLE detector when the EI state at the differential input gets interrupted or is resumed;
   detecting whether the differential input is driven by a Low Frequency Periodic Signalling (LFPS) or by a Super Speed (SS)/Enhanced Super Speed (eSS) signalling by means of at least one signal type detector, said signal type detector having a decision latency time being less than the time delay provided by the time delay block;
   making a decision whether LFPS or SS/eSS signalling is to be transmitted by means of at least one decision circuit, said decision being based on information from the IDLE detector or from the signal type detector;
   at least one input stage being connected to the decision circuit; and
   driving the light-emitting component by means of at least one output stage, said output stage being connected downstream at least one input stage and being turned on or turned off by the decision circuit,
   wherein the delay time is chosen with respect to distinguishing a LFPS ping sequence representing an LFPS burst of not longer than about 200 ns, and an LFPS based PWM (pulse-width modulation) signalling (LBPS) logic "0" being represented by an LFPS burst of at least about 500 ns.

15. A method for processing an optical signal by means of at least one circuit arrangement, said optical signal having been received from at least one light-receiving component, comprising the steps of:
   triggering by means of the optical signal at least one decision circuit including a time delay functionality;
   gating or switching on at least one oscillator stage by at least one enable signal from the decision circuit;
   activating at least one Low Frequency Periodic Signalling (LFPS) output driver in case of the optical signal being based on LFPS;
   activating at least one Super Speed (SS)/Enhanced Super Speed (eSS) output driver in case of the optical signal being based on SS/eSS signalling,
   wherein the delay time is chosen with respect to distinguishing a LFPS ping sequence representing an LFPS burst of not longer than about 200 ns, and an LFPS based PWM (pulse-width modulation) signalling (LBPS) logic "0" being represented by an LFPS burst of at least about 500 ns.

16. A method for using the at least one circuit arrangement according to claim 1 for a USB 3 data transport protocol serial communication link over at least one optical transmission line.

17. The method according to claim 16, wherein the optical transmission line is at least one waveguide.

18. The method according to claim 17, wherein the waveguide is at least one fiber.

19. The method according to claim 18, wherein the fiber is at least one glass fiber.

* * * * *